United States Patent [19]

Wenzel et al.

[11] Patent Number: 4,546,520
[45] Date of Patent: Oct. 15, 1985

[54] DEVICE FOR THE MECHANICAL PROCESSING OF FISH AND INTRODUCING THE SAME INTO CANS

[76] Inventors: Werner Wenzel, Doberanweg 8; Reinhard Ollik, Knud-Rassmussenstr. 42, both of 2400 Lübeck, Fed. Rep. of Germany

[21] Appl. No.: 578,502

[22] Filed: Feb. 9, 1984

[30] Foreign Application Priority Data

Feb. 16, 1983 [DE] Fed. Rep. of Germany ....... 3305239
Feb. 16, 1983 [DE] Fed. Rep. of Germany ....... 3305240
Feb. 16, 1983 [DE] Fed. Rep. of Germany ....... 3305241

[51] Int. Cl.⁴ .............................................. A22C 25/14
[52] U.S. Cl. ............................................ 17/59; 17/63
[58] Field of Search ................................ 17/59, 58, 63

[56] References Cited

U.S. PATENT DOCUMENTS

| | | | |
|---|---|---|---|
| 1,724,587 | 8/1929 | Anker-Holth | 17/59 |
| 1,828,725 | 10/1931 | Muller et al. | 17/59 |
| 2,775,785 | 1/1957 | Kurzbin | 17/59 |

FOREIGN PATENT DOCUMENTS 921887 12/1954 Fed. Rep. of Germany .......... 17/59

Primary Examiner—Willie G. Abercrombie
Attorney, Agent, or Firm—Edward F. Levy

[57] ABSTRACT

The invention concerns a device for processing fish and introducing the same into cans. It is characterized in that the fish are placed in alternating alignment in threes or fours in troughs of a conveyor which comprises one middle trough element flanked by two outer ones and whose support surface comprises a base plate raisable and lowerable by the force of a spring. The fish brought onto the base plate are guided to a cutting device which cuts out the rump pieces of the fish and which is adjustable with regard to the desired fish length. Subsequently they are gutted by the use of low pressure. The transfer of the fish into the cans held ready in time with the troughs occurs in the lower run of the conveyor, maintaining the packing pattern predetermined by the introduction into cans by lifting the base plate. In that process the can supply is monitored such that each can is only confronted with a full trough.

19 Claims, 5 Drawing Figures

DEVICE FOR THE MECHANICAL PROCESSING OF FISH AND INTRODUCING THE SAME INTO CANS

BACKGROUND OF THE INVENTION

1. Field of the Invention

The invention concerns a device for the mechanical processing of fish and introducing the same into cans, especially of small bulk fish like sardines, herrings, sprats or the like for preserving or conserving in preparation ready for consumption, the device comprising a rotatingly driven conveyor guided around deflection elements and comprising at least three conveyor portions defining two outer and at least one inner portion, each guided parallel to each other, driven synchronously and having trough elements which are arranged in a complementary manner with respect to each other to form troughs receiving the fish to be processed, the inner trough elements being flanked by at least one of the two outer trough elements and forming a slot with the latter, the device also comprising cutting means for separating head and tail from each fish and including at least two knives which each penetrate one of the slots between two trough elements down to beneath the base surface of the same, the device further comprising a gutting station for removing the innards from the fish rumps and including two suction heads arranged on the sides of the knife slots and coming into working relationship with the beheading surface of the rump pieces in order to remove the innards, and the device further comprising a transfer station for introducing the fish rumps positioned in the troughs into cans advanced in a timed manner with the troughs.

2. Description of Prior Art

It is an essential aim in the manufacture of fish preserves or conserves in the form of cans with parts of fish, especially of rump pieces prepared ready for consumption to gain a fish content in weight of as small or narrow a tolerance as possible. This can be achieved in that fish of differing size are put together instinctively with regard to the portion weight in portions of three or four fish according to a certain packing pattern from which can-adapted or -sized fish portions of uniform length are cut by separating head and tail. For reasons of better optical presentation it is aimed to put together the portions from fish of at least nearly the same size. For this reason as well as with regard to the adjustment of the desired fish content a presorting of the fish according to size classification is carried out so that a rather small weight tolerance can be achieved with pieces of uniform length. If other size fish are to be processed then the observance of the tolerance can be essentially secured by changing the piece length and/or the packing pattern.

A device with the above stated classification feature can be taken from Spanish utility model application no. 250 008 (6). In this device fish introduced into troughs of the desired type are guided to a cutting device which compromises two circular knives penetrating into the slots between the troughs elements. A gutting device in the form of a suction device is positioned downstream of the cutting device, which suction device comprises two suction heads arranged in the cutting plane of the circular knives, the suction heads come into functional relationship with the beheading surfaces of the rump pieces.

If an adjustment for a different size of fish is to be carried out it is disadvantageous in this machine that the adjustment or setting of the desired fish content is very time-consuming and can only be carried out when the machine is stopped. Furthermore it cannot be avoided that single troughs are not occupied which has the consequence that the corresponding cans advanced in time with the troughs remain empty. This is especially disadvantageous with a machine which is interlinked, e.g. with a continuous flow installation for treating the can contents and a subsequent device for introducing sauce and seaming the cans.

3. Objects of the Invention

Due to the demand for a quick treatment of the fish to be processed which is especially important in tropical or subtropical regions for reasons of freshness it is a main object of the invention to suggest a device with the help of which rump pieces can be introduced into the cans efficiently, maintaining the packing pattern predetermined when the fish are introduced into the cans. Another object of the invention lies in that a simple adaptation of the length of the rump pieces can be effected which can be carried out while the machine is in operation should be achieved. It is a further object of the invention to improve the downstream gutting device with regard to its efficiency.

SUMMARY OF THE INVENTION

According to the present invention these objects are achieved in a device of the type described in the introductory paragraph of the specification in that each inner trough element is provided on its base with a base plate forming the support surface for the fish and adjustable in height; that an activating element is arranged in the region of the transfer station to be activated in time with the advancing movement of the inner trough elements, which activating element comes into functional relationship with the base plate; that the knives of the cutting device, which are preferably designed as circular knives and the suction heads are designed adjustable with respect to their distance from each other by means of a central adjusting mechanism; and that the transfer of the cans into the filling position ensues by means of an inserter which is activatable by a signal transmitter monitoring the filling of each inner trough element in time with the advancing movement of the inner trough elements.

Advantageously the base plate is arranged to be both lowered and raised resiliently, preferably by the force of a spring so that the fish are held fixed in the given position during the processing and continuation of their movement. This fixing in the given position can be achieved in another preferred embodiment of the invention in that a hugger belt covering the opening of the inner trough elements is provided at least in the deflection region of the central conveyor to be passed by the filled inner trough elements, which belt is rotatingly driven continuously and synchronously to rotate with the central conveyor portion or running free with the same.

In order to achieve an active ejection of the rumps filling the troughs from the latter a pair of gripping elements encompassing the front faces of the inner trough elements are provided in the region of the transfer station. In this context the parts of the gripping elements encompassing the inner trough elements may expediently be formed roof-like symmetrically to the transversal centre of these trough elements and/or arranged to be moved out of engagement in time with the movement of the inner trough elements.

An especially advantageous cleaning effect can be achieved in that effective means for pincer-like gripping of the parts of the belly contents of the fish sucked into the suction opening and for extracting the same from the belly cavity of the fish are arranged in each suction head directly behind the suction opening positioned in the level of the cutting surface of the beheading cut. Thereby it is achieved that all innards jutting out of the belly cavity are extracted safely.

Especially effective in function is the use of means for gripping and extracting the innards or intestines, which means comprise a rotatingly driven rotational body and a clamping surface associated to the circumferential surface of the rotational body at a short distance therefrom. Therein the rotational body may preferably be designed as a vane roller with differing axis position, which axis may either be essentially parallel or perpendicular to the conveying plane. A very simple solution may be achieved if the drive of the rotational body resp. the vane roller is performed by engaging the central conveyor portion carrying the inner trough elements. In this embodiment an offset arrangement of the suction heads can be advantageous, especially if each suction head is provided with a shutter closing the suction opening, which shutter may be formed to be activated by the fish since thus a vacuum may be concentrated on each suction head.

According to a preferred embodiment of the inserter for the transfer of the cans into the filling position the inserter is controlled by means of a cam driven synchronously in time with the advancing movement of the troughs, a locking mechanism being provided between the cam and the inserter, which locking mechanism is activatable by a positioning element and controllable in dependence on the switch signal of the signal transmitter.

In order to achieve an optimum with regard to the circuit means the signal transmitter can be positioned the same number of trough parts in front of the transfer station as empty cans are provided between feeding and transfer stations.

In order to avoid that cans reach the transfer station in the wrong position, e.g. with the opening facing downwards, the can path heading into the transfer station can be provided with a monitoring device for controlling the position of the same.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

DETAILED DESCRIPTION OF THE PREFERRED EMBODIMENT

Figure 1:
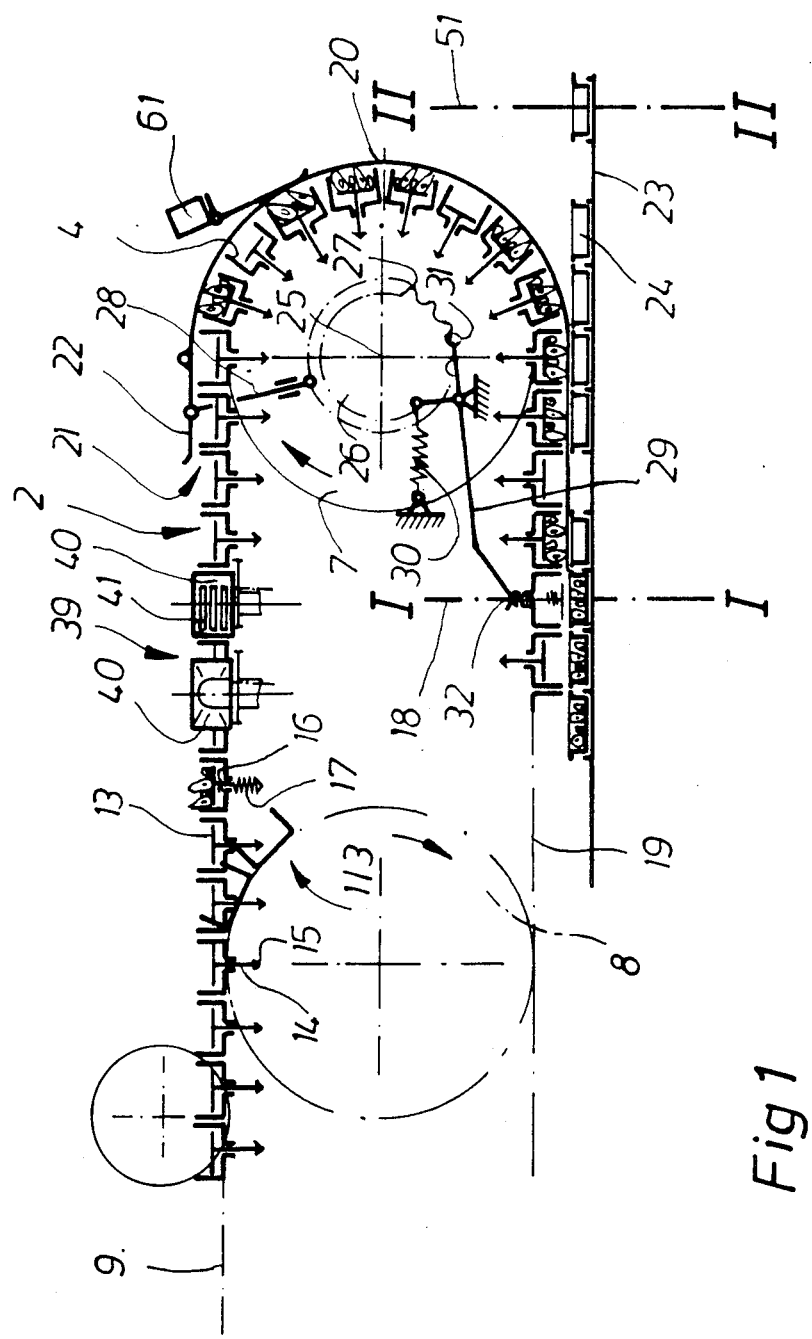
FIG. 1 shows a partial side view of the device according to the invention.

An endlessly running driven conveyor is arranged in a notshown frame of a machine for gutting small bulk fish, which conveyor comprises three single conveyor portions 1, 2 and 3 running parallel and synchronously to each other. The conveyor portion 2 is equipped with inner trough elements 4 connected closely to each other which are made up to troughs 6 receiving the fish by means of outer trough elements 5 carried by the conveyor portions 1 and 3. A deflection of the central conveyor portion 2 ensues by means of a deflection wheel 7, and that of the outer conveyor portions 1 and 3 by means of two deflection wheels 8 fixed to a common axis. The position of the deflection wheels 8 is arranged in a manner that the deflection of the conveyor portions 1 and 3 occurs upstream of that of the central conveyor portion 2. Gaps or slots 10 are left between each outer trough element 5 and the central trough element 4 of the upper runs of the respective conveyor portions, into which slots circular knives 12 of a cutting device 11 penetrate. The cutting device 11 is arranged shortly upstream of the deflection of the outer conveyor portions 1 and 3. Each inner trough element 4 is provided with a base plate 13 which is held by means of a guiding tappet 14 guided in the base of the trough element 4 by a tappet head 15 positioned at the free end of the tappet 14. A spring 16 is positioned between the base plate 13 and the base of the trough element 4, while another spring 17 is arranged between the trough element 4 and the tappet head 15. A cover guide 20 which covers the inner trough elements 4 from above extends at least in the region of the deflection wheel 7 up to a transfer station 18 in the return run of the central conveyor portion 2, the entry end 21 of the cover guide 20 being formed as a flap 22 leading over to the cover guide 20. This flap 22 is adapted in a suitable manner to be lowered and raised in time with the the inner trough elements 4 running underneath it. A can conveyor 23 formed e.g. as a carrousel or similar revolving device is arranged underneath the return run 19 of the central conveyor portion 2, which can conveyor conveys cans or tins in synchronised movement with the central conveyor portion 2 such that a can 24 staying in time relatively motionlessly with respect to every inner trough element 4 of the central conveyor portion 2 is associated to these trough elements 4. A cam disc 26 running synchronously with the deflection wheel 7 is fixed to the axis 25 thereof, the periphery 27 of the cam disc 26 being formed almost in the form of a chain cog corresponding to the pitch of the inner trough elements 4. On the one hand a roller tappet 28 activating the flap 22 is in functional relationship with this cam disc 26 and on the other an activating element 29 in the form of a two-armed lever. The latter carries a cam follower 31 pressed by the force of a spring 30 against the cam disc 26 on its one end and at the other a runnerlike shoe which can be swivelled into the path of the tappet heads 15 of the guiding tappets 14 in the region of the transfer station 18. A gripping device 33 comprising a pair of holding or gripping elements 34 encompassing the front sides, i.e. the lateral faces of the inner trough elements 4 is provided in the region of the transfer station 18 as can be seen from FIG. 2. The gripping elements 34 define parts 35 which overlap the inner trough elements 4 and are formed roof-like. The gripping elements 34 are connected via an expander mechanism 36 to the activating element 29 resp. its shoe 32.

Figure 2:
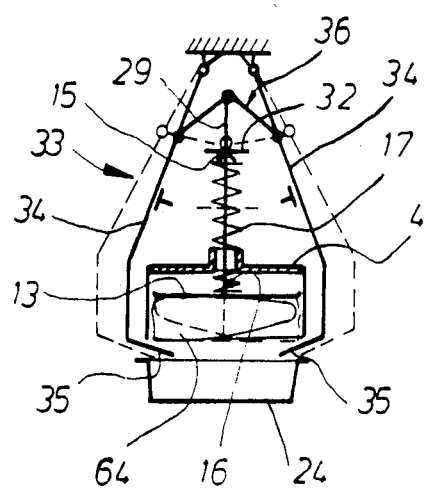
FIG. 2 shows a partial cross-section along the lines I—I of FIG. 1.
Figure 3:
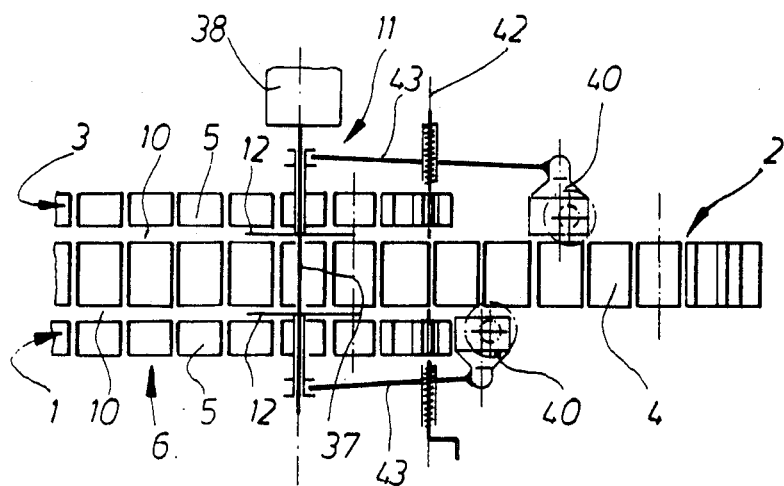
FIG. 3 shows a partial top view of the device simplified compared to FIG. 1.
Figure 4:
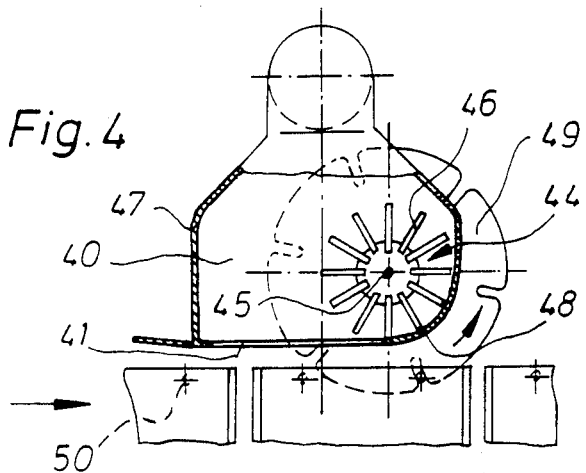
FIG. 4 shows a partial top view of a suction head.

The circular knives 12 of the cutting device 11 are, according to FIG. 2, guided moveably to each other on a common axis 37 and driven by a motor 38. The inner trough elements 4 led separately between the deflection wheels 7 and 8 are flanked on both sides by suction heads 40 of a gutting device, which suction heads are associated to the open leading edges of the inner trough elements 4 with slot-like suction openings 41. The suction heads 40 are formed adjustably in the longitudinal direction of the inner trough elements 4 and mirror symmetrically to the transversal centre of the same by means of a left-right threaded spindle 42 formed in a suitable manner. Each of the circular knives 12 is coupled with the suction head 40 on the corresponding side by means of an entraining element 43 so that the respective distance between the suction heads 40 is transferred to the distance of the circular knives 12. The suction heads 40 connected to a not-shown low pressure source each surround, according to FIG. 4, a rotational body 44 which rotates about an axis 45 perpendicular to the conveying direction, which body 44 is formed as a vane roller 46. A clamping surface 48 forming a part of a housing 47 opposes at a short distance the periphery of the vane roller 46. The axis 45 of the vane roller 46 is arranged to extend out of the underside of the housing 47 and bears a drive wheel 49 there which is in spring wheel or stub-tooth like contact with the corresponding cogs 50 on the underside of the inner trough elements 4.

Figure 5:
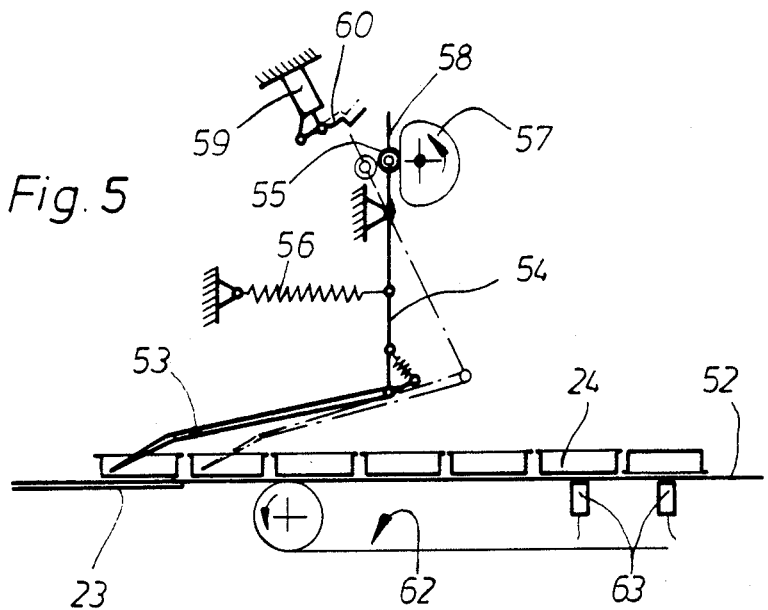
FIG. 5 shows a partial view cut along the line II—II of FIG. 1 with a representation of the supply of the cans.

A feeding station (shown in detail in FIG. 5) is positioned on the periphery of the can conveyor 23 at which station the cans 24 are transferred from a can path 52 to the can conveyor 23 in a timed manner. This station comprises an inserter 52 which is mounted pivotally at one end of a two-armed lever 54. A cam follower 55 is fixed to the other arm of said lever, which follower is held by means of the force of a spring 56 against a cam 57 driven synchronously in time with the troughs 6. The lever arm carrying the cam follower 55 is provided with a free end 58 extending over the cam follower 55, a locking mechanism comprising a catch 60 activatable by a positioning or setting element 59 being arranged in the swivel path of the free end 58. The positioning element 59 is in fuctional relationship with a signal transmitter 61 which is installed in the region of the central conveyor portion 2.

The can path 52 can be formed by a belt conveyor 62. Two approximating switches 63 are mounted under its carrying run at a distance the same as that of the cans 24 in such a way that they can be influenced by the can bottoms.

The method of operation of the device is the following:

Fish fed into the troughs 6 preferably in threes or fours in reciprocal resp. alternating position are first guided to the cutting device 11 which separates the fish rumps positioned in the inner trough elements 4 by cutting off the heads and tails. While the latter are guided to the waste by immediate deflection of the outer conveyor portions 1 and 3 carrying the outer trough elements 5 the rump pieces are led to the gutting device. The gutting process occurs during the passing-by of the beheaded ends of the rump pieces by the influence of low pressure with which the belly cavity of each fish is charged by the beheading surfaces lying against the suction openings 41 of the suction heads 40. The parts of the innards which are secured in the belly cavity by ligaments are caught by pincer-like gripping by means of the vane roller 46 positioned in the housing 47 of each suction head 40 and safely extracted due to the rotation of the vane roller 46 and due to the advancing movement of the rump pieces 64. The weight of fish portions ready for canning thus achieved can be influenced during operation of the machine by rotation of the left-right-thread spindle 42. This effects that the distance between the suction heads 40 is changed mutually with that of the circular knives, and therefore the length of the rump pieces can be changed.

For energy-saving and noise-reduction reasons the suction opening 41 of each suction head 40 can be provided with a cover plate which is arranged to be raised.

The rump pieces 64 are, in the further course of the central conveyor portion 2, conveyed into the region of the deflection wheel 7. In that process they run under the flap 22 which is rhythmically raised and lowered in time with the inner trough elements 4 and effcts that the filling mass, i.e. the rump pieces filling the respective trough element, is equalised to a uniform level by displacement of the base plate 13 under the force of the spring 16, the filling mass being held at this level by the subsequent cover guide 20. When the filling mass reaches the transfer station 18 it is held back against gravity first of all by means of the holding resp. gripping device 33 resp. its parts 35 encompassing the inner trough elements 4 and by means of the spring 16 which may be biassed. This continues until the activating element 29 is activated by means of the cam disc 26 and affects the tappet head 15 of the guiding tappet 15 with its shoe 32 to press it down. Due to the coupling of the activating element 29 with the holding device 33 via the expanding mechanism 36 the gripping elements 34 are expanded increasingly and thereby the filling mass is released. In this process the lowering speed of the activating element 29 is so synchronised that the base plate 5 remains in safe contact with the filling mass.

The cover guide 20 can be replaced by a hugger belt covering the opening of the inner trough elements 4, a stress of the rump pieces 64 by sliding friction thus being avoidable.

In this way, maintaining the packing pattern in the inner trough elements 4, the rump pieces 64 reach the cans 24 which are held ready in the transfer station 18 synchronously to the rhythm of movement of the trough elements 4. In this process the provision of the cans occurs with the help of the can conveyor 23 which is fed with cans 24 from the can path 54. This feeding of the can conveyor 23 with cans 24 is accomplished by means of a mechanism positioned in the feeding station 51, the activation of this mechanism being monitored by the signal transmitter 61 which effects that a can 24 is pushed into the path of the can conveyor 23. If the signal transmitter 61 registers an empty trough the activating signal for the positioning or settling element 59 does not occur so that the inserter 53 is held firmly by means of the catch 60 in the withdrawn position effected by the cam 57. When a trough element 4 filled with fish passes the signal transmitter 61 the positioning element 59 receives an activating signal in the same moment as the raised part of the cam 57 is opposite the cam follower 55 so that the free end 58 of the lever 54 is released by withdrawal of the catch 60. This means that the cam follower 55 can follow the cam 57 by the force of the spring 56 and the inserter 53 can insert a can 24. The can path 52 can, at least shortly upstream of the transfer station 51, be provided with a belt conveyor 62 carrying cans 24, the cans reaching the conveyor under the influence of gravity.

Therein each can standing ready to be inserted can be gripped by not shown lateral leaf springs and thus the impact pressure of the following cans intercepted. In the insertion process the leaf springs are displaced by the can to be inserted and spring back behind this into the path of the next can so that this can be held.

The signal transmitter can be formed as a feeler working without contact, e.g. as light-optical feeler or also activatable mechanically.

The monitoring of the position of the cans 24 in the can path 52 can occur via two approximating switches 63 which are at the same distance apart as the pitch of the cans, can be influenced by the can bottoms and connected in series. The change in signal if a can is in the wrong position can be used to activate an ejector for this can. Both approximating switches 63 can also be so connected that the change in signal effected by lacking can supply can be used by both approximating switches as a sign of this lack.

What is claimed is:

1. Device for the mechanical processing of fish having a head, a rump including innards and a tail and introducing the same into cans, especially of small bulk fish like sardines, herrings, sprats or the like for preserving or conserving in preparation ready for consumption, said device comprising
    a. rotatingly driven conveyor means carrying trough means, defining a conveying plane and creating an advancing movement in a conveying direction for said trough means, being guided around deflecting elements defining a deflection region, and comprising at least three conveying portions defining two outer and at least one inner conveyor portions, guided parallel to each other, driven synchronously, defining an upper and a lower return run and carrying two rows of outer and at least one row of inner trough elements, respectively, which are arranged in a complementary manner with respect to each other to form said trough means receiving said fish to be processed, each extending transversally and having a base defining a base surface opposite a trough opening and lateral front faces, said inner trough element rows being flanked by at least one of said two outer trough element rows, two neighbouring trough elements rows forming a slot between each other,
    b. cutting means for separating said head and said tail from each fish to produce a rump piece with a beheading surface and a tail cut surface, said cutting means including knife means which each penetrate one of said slots down to beneath said base surface of said trough elements,
    c. a gutting station arranged downstream of said cutting means for removing said innards from said rump and including suction head means with suction openings arranged on the sides of said slots and with said suction openings coming into functional relationship with said beheading surface of each rump piece in order to remove said innards, and
    d. a transfer station arranged downstream of said gutting station for introducing said fish rumps positioned in said inner trough elements into cans advanced in a timed manner with said trough elements into filling position, wherein
    e. each of said inner trough elements is provided on said base with a base plate forming a support surface for said fish and being adjustable in height with respect to said conveying plane,
    f. an activating element is arranged in the region of said transfer station to be activated in time with said advancing movement of said inner trough elements, which activating element comes into functional relationship with said base plate,
    g. said knife means and said suction head means are designed adjustable with respect to their distance from each other by means of a central adjusting mechanism, and
    h. said advancing of said cans into said filling positions ensues by means of inserter means which are activatable by signal transmitter means monitoring the filling of each of said inner trough elements in time with said advancing movement of said inner trough elements.

2. Device as claimed in claim 1, wherein said base plate is arranged to be height adjustable by resilient lowering and raising.

3. Device as claimed in claim 1, wherein at least in said deflection region of said inner conveyor portion to be passed by said inner trough elements when filled hugger belt means covering said trough openings of said inner trough elements are provided, which belt means are rotatingly driven continuously and synchronously to rotate with said inner conveyor portion.

4. Device as claimed in claim 1, wherein at least in said deflection region of said inner conveyor portion to be passed by said inner trough elements when filled hugger belt means covering said trough openings of said inner trough elements are provided, which belt means are running free with said inner conveyor portion.

5. Device as claimed in claim 1, wherein said transfer station is arranged in the region of said return run of said inner conveyor portion.

6. Device according to claim 1, wherein a pair of gripping elements encompassing said front faces of said inner trough elements are provided in the region of said transfer station.

7. Device according to claim 6, wherein said gripping elements include parts encompassing said inner trough elements, which parts are formed roof-like symmetrically to said transversal extension of said trough elements.

8. Device as claimed in claim 6, wherein said gripping elements are arranged to be moved out of said encompassing engagement with said inner trough elements in time with said movement of said inner trough elements.

9. Device as claimed in claim 1, wherein effective means for pincer-like gripping of such parts of said innards of said fish sucked into said suction opening and for extracting such parts from said rump are arranged in each of said suction head means directly behind said suction opening positioned in the level of said beheading surface.

10. Device as claimed in claim 9, wherein said means for gripping and extracting said innards comprise rotatingly driven rotational body means defining a circumferential surface and a clamping surface associated to said circumferential surface at a short distance from said rotational body means.

11. Device as claimed in claim 10, wherein said rotational body means are designed as vane roller means.

12. Device as claimed in claim 10, wherein said rotational body means rotate about an axis essentially perpendicular to said conveying plane.

13. Device as claimed in claim 10, wherein said rotational body is driven by engaging said inner conveyor portion.

14. Device as claimed in claim 1, wherein said suction head means are arranged offset to each other with respect to said conveying direction.

15. Device as claimed in claim 9, wherein said suction head means are arranged offset to each other with respect to said conveying direction.

16. Device as claimed in claim 1, wherein said inserter means are controlled by cam means driven synchronously in time with said advancing movement, and wherein a locking mechanism is provided between said cam means and said inserter means, which locking mechanism is activatable by a positioning element and controllable in dependence on a switch signal produced by said signal transmitter means.

17. Device as claimed in claim 16, wherein can conveyor means driven synchronously with said inner conveyor portion and positioning the cans with respect to the latter, and a feeding station for delivering empty cans to said can conveyor means are provided, and wherein said signal transmitter means are positioned as many trough parts upstream of said transfer station as empty cans are provided to fit between said feeding station and said transfer station.

18. Device as claimed in claim 17, wherein a can path heading into said transfer station is provided with a monitoring device for controlling the position of said cans.

19. Device as claimed in claim 1, wherein said knife means are designed as rotatingly driven circular knives

* * * * *